United States Patent
Gizowski et al.

(10) Patent No.: US 6,193,833 B1
(45) Date of Patent: Feb. 27, 2001

(54) METHOD OF LASER WELDING TRANSMISSION FILTER HOUSING COMPONENTS

(75) Inventors: John W. Gizowski, LaGrange Park, IL (US); Markus Beer, Morsbach (DE); J. Thomas Schriempf, Alexandria, VA (US)

(73) Assignee: SPX Corporation, Muskegon, MI (US)

( * ) Notice: Subject to any disclaimer, the term of this patent is extended or adjusted under 35 U.S.C. 154(b) by 0 days.

(21) Appl. No.: 09/387,807

(22) Filed: Sep. 1, 1999

Related U.S. Application Data

(60) Provisional application No. 60/099,086, filed on Sep. 4, 1998.

(51) Int. Cl.[7] ..................................................... B32B 31/00
(52) U.S. Cl. .................................... 156/272.8; 156/308.4; 156/350; 219/121.64; 219/121.79
(58) Field of Search ............................... 156/272.8, 73.5, 156/73.6, 69, 70, 308.4, 350; 219/121.64, 121.79

(56) References Cited

U.S. PATENT DOCUMENTS

| | | | |
|---|---|---|---|
| 3,560,291 | * | 2/1971 | Foglia . |
| 4,425,435 | * | 1/1984 | Barnes, Jr. ........................ 219/121 D |
| 4,564,932 | * | 1/1986 | Lange . |
| 4,636,609 | * | 1/1987 | Nakamata ...................... 219/121 LD |
| 5,049,274 | | 9/1991 | Leason et al. . |
| 5,095,606 | * | 3/1992 | Barrick . |
| 5,151,149 | * | 9/1992 | Swartz ............................... 156/379.8 |
| 5,279,693 | * | 1/1994 | Robinson .......................... 156/272.8 |
| 5,480,155 | * | 1/1996 | Molitor ................................ 273/220 |
| 5,647,504 | * | 7/1997 | Gullett ................................. 220/612 |
| 5,770,328 | * | 6/1998 | Friedli . |
| 5,830,300 | * | 11/1998 | Suzuki . |
| 5,843,265 | * | 12/1998 | Grimm ............................... 156/272.2 |
| 5,853,577 | | 12/1998 | Gizowski et al. . |
| 5,855,707 | * | 1/1999 | Luettgen . |
| 5,874,146 | * | 2/1999 | Kagan ..................................... 428/57 |
| 5,893,959 | * | 4/1999 | Muellich ........................... 156/272.8 |
| 5,949,959 | * | 9/1999 | Lovett .................................. 392/408 |

FOREIGN PATENT DOCUMENTS

| | | |
|---|---|---|
| 4225679 | 2/1994 | (DE) . |
| 9526869 | 10/1995 | (WO) . |

OTHER PUBLICATIONS

Literature entitled "Automotive Laser Applications Workshop 1998" (Mar. 3, 1998).

* cited by examiner

*Primary Examiner*—Chester T. Barry
(74) *Attorney, Agent, or Firm*—Hovey, Williams, Timmons & Collins

(57) ABSTRACT

A preferred transmission filter (10) includes a first flange (18) transparent to a laser beam (58) and includes a second flange (20) opaque to the laser beam (58) and meltable upon exposure thereto. The flanges (18,20) are in registered, abutting relationship with a laser weld bead (62) at the juncture (44) between the flanges (18,20) to provide a fluid seal circumscribing the filter(10). The preferred filter manufacturing apparatus (12) includes a laser (54) coupled to a robot arm (50) controlled by a programmable logic controller (52). The controller (52) operates the robot arm (50) in order to direct the laser beam(58) through the first flange (18) onto the second flange (20) and along the juncture (44) to form the laser weld bead (62).

22 Claims, 1 Drawing Sheet

METHOD OF LASER WELDING TRANSMISSION FILTER HOUSING COMPONENTS

RELATED APPLICATIONS

This application claims priority on previously filed and co-pending U.S. Provisional Application filed Sep. 4, 1998 and having App. No. 60/099,086.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of transmission filters and the manufacture thereof. In particular, the invention is concerned with a preferred transmission filter having a first flange transparent to a laser beam and a second flange opaque to the laser beam and meltable upon exposure thereto. The flanges are in registered, abutting relationship with a laser weld bead at the juncture between the flanges to provide a fluid seal circumscribing the filter.

2. Description of the Prior Art

A prior art fluid filter, such as an oil or transmission filter for a vehicle, includes first and second housing sections each presenting a circumscribing flange composed of synthetic resin material with the housing sections defining a chamber containing filter media. One of the flanges presents an upstanding weld rib that engages the surface of the other flange at a juncture. To join the flanges during manufacture, the flanges are vibration welded by vibrating one of the flanges at a high frequency. This creates heat at the juncture to create a weld bead circumscribing the filter and providing a fluid seal. The edges of the filter media are crimped between the flanges inboard of the weld bead to provide an additional fluid seal.

One of the problems with the prior art is that the edges of the filter media cannot be crimped as tightly as desired because to do so might result in damage to the edges during the vibration welding process. Another problem is that vibration welding process may not allow production rates as high as desired.

SUMMARY OF THE INVENTION

The present invention solves the prior art problems discussed above and provides a distinct advance in the state of the art. In particular, the fluid filter, manufacturing apparatus and method hereof enable increased manufacturing rates and provide a higher quality fluid seal.

The preferred fluid filter includes first and second housing sections forming an interior chamber with filter media received therein. The housing sections include respective first and second circumscribing flanges composed of synthetic resin material with the first flange composed of material transmissive to laser light and the second flange opaque to laser light and meltable upon exposure thereto. The flanges are in a registered, abutting relationship at a circumscribing juncture. A laser weld bead at the juncture couples the flanges to provide a fluid seal circumscribing the filter.

The preferred filter manufacturing apparatus includes a robot arm, a programmable processor coupled with the arm to control the movement thereof, a laser coupled with the robot arm operable to emit a laser beam, and a fixture to hold the components of the preferred fluid filter. The processor includes programming to operate the robot arm in a manner to direct the laser beam through the first flange onto the second flange along a path circumscribing the filter at the juncture in order to form the laser weld bead thereat in accordance with the preferred method of the present invention.

DETAILED DESCRIPTION OF THE PREFERRED EMBODIMENT

Figure 1:
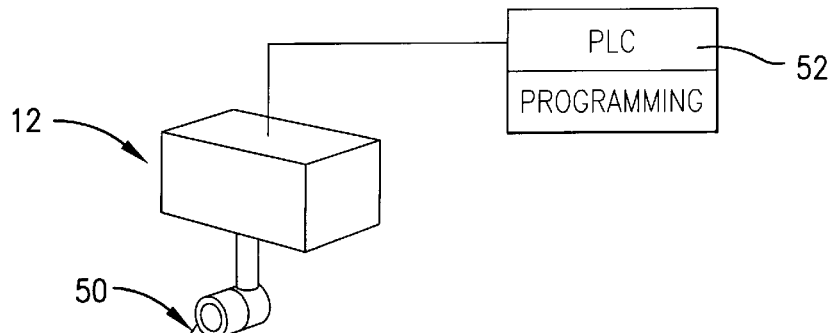
FIG. 1 is a schematic representation illustrating the preferred fluid filter along with the preferred filter manufacturing apparatus in accordance with the present invention.

FIG. 1 illustrates preferred fluid filter 10 along with preferred manufacturing apparatus 12 in accordance with the present invention. As further illustrated in FIGS. 2 and 3, filter 10 includes first and second housing sections 14 and 16 having respective first and second, circumscribing flanges 18 and 20 extending therefrom, and filter media 22.

First housing section 14 is preferably composed of synthetic resin material transmissive to laser light such as unpigmented, glass-filled, nylon 6/6. Housing section 14 integrally includes housing walls 24 and 26 with first flange 18 extending outwardly from housing wall 26.

First flange 18 integrally includes flange wall 28 extending generally transversely from housing wall 26, edge wall 30 extending from the distal edge of flange wall 28 toward second housing section 16, and crimping rib 32 extending from the inboard face of flange wall 28 adjacent housing wall 26. Flange wall 28 also presents weld surface 34 located between edge wall 30 and rib 32.

Second housing section 16 is preferably composed of synthetic resin material opaque to laser light and meltable upon exposure thereto such as black pigmented, glass-filled, nylon 6/6. Housing section 16 integrally includes housing walls 36 and 38 with second flange 20 extending outwardly from housing wall 38.

Second flange 20 integrally includes flange wall 40 extending generally transversely from housing wall 38, and upstanding weld rib 42 extending from the inboard face of flange wall 40 toward flange wall 28 of first flange 18. The distal end of weld rib 42 presents weld face 44 abutting weld surface 34 of first flange 18 to form circumscribing juncture 46 between flanges 18 and 20.

Flange wall 40 is also configured to present crimping groove 48 complementally configured and positioned to receive crimping rib 32. The edges of filter media 22 are positioned inboard of juncture 46 and crimped between rib 32 and groove 48.

Manufacturing apparatus 12 includes robot arm 50, programmable logic controller (PLC) 52, laser 54 and fixture 56. PLC 52 is operable to control the operation and movement of robot arm 50 according to the programming stored therein. Robot arm 50 and PLC 52 are conventional in nature and the programming thereof is well within the skill of the art. Fixture 56 is also conventional of the type used for holding a fluid filter in position during conventional vibration welding.

Laser 54 is preferably a 400 watt neodynium YAG pulse laser for producing a pulsed laser beam. It will also be appreciated that other types of lasers can be used such as a 2000 watt neodynium YAG continuous wave laser.

Figure 2:
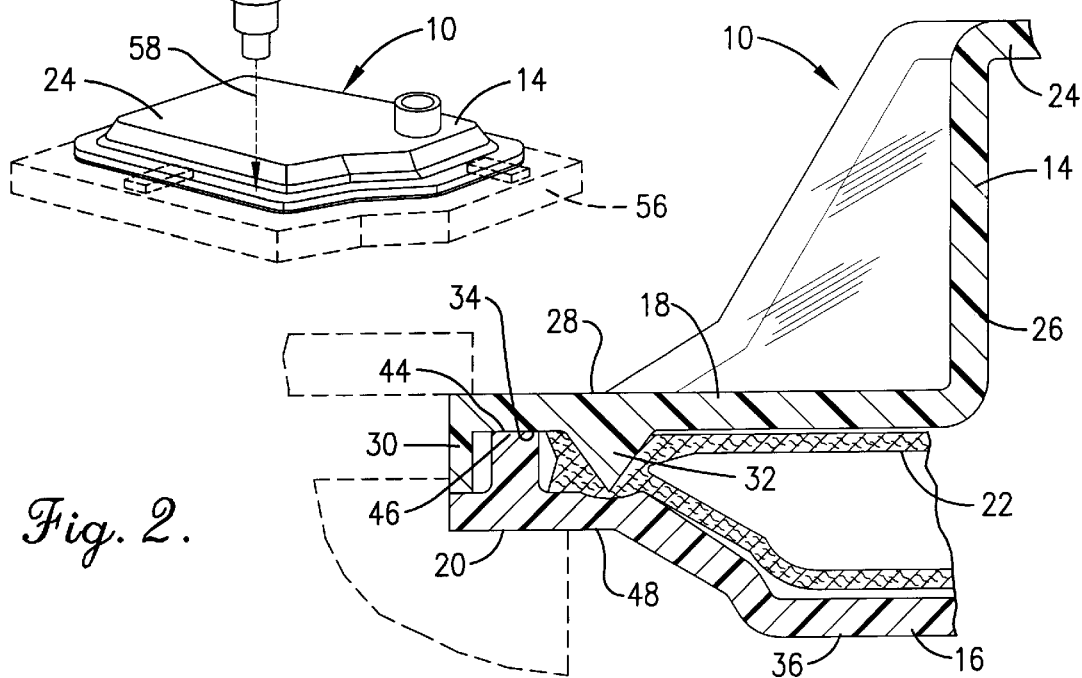
FIG. 2 is a partial sectional view of the filter of FIG. 1 before formation of a laser weld bead by the apparatus of FIG. 1.
Figure 3:
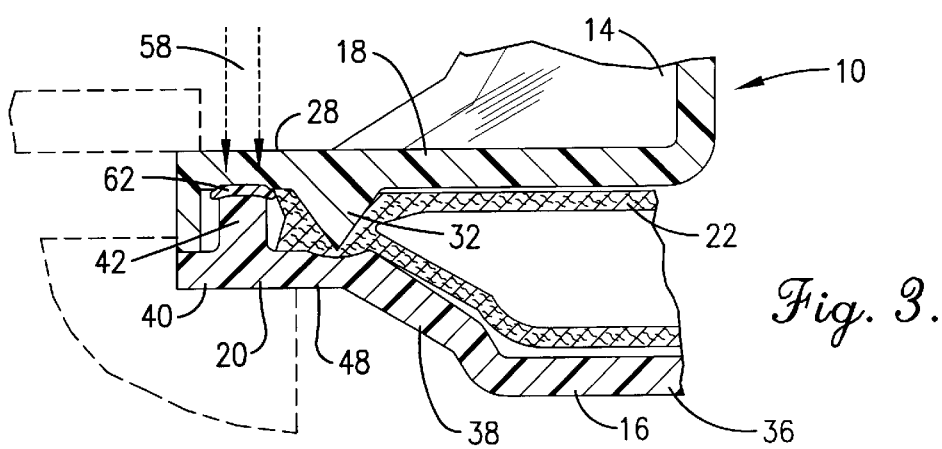
FIG. 3 is a view similar to FIG. 2 after formation of the laser weld bead.

Initially, filter 10 is placed in fixture 56 with flanges 18,20 in registered, abutting relationship with filter media 22 received within chamber 60 defined by housing walls 24, 26 and 36, 38, and with the edges of the filter media crimped between rib 32 and groove 48 as illustrated in FIG. 2. First housing section 14 is positioned between laser 54 and second housing section 16.

In operation, PLC 52 controls robot arm 50 according to the programming in order to direct laser beam 58 emitted from laser 54 toward filter 10. More specifically, PLC 52 directs laser beam 58 through first flange 18, which is transmissive to laser light, onto weld face 44 of second flange 20 at juncture 46 and along the path of juncture 46. Upon exposure to laser beam 58 as it traverses along juncture 46, weld face 44 (opaque to laser light) is heated as is the material adjacent weld surface 34 to form a melt of synthetic resin material.

After completing the closed loop path defined by juncture 46, PLC 52 turns off laser beam 58. The melt of synthetic resin material rapidly cools to form a laser weld bead 62 at juncture 46 circumscribing filter 10 to join flanges 18, 20 and thereby join housing sections 14, 16 to form filter 10. Laser weld bead 62 also forms a continuous fluid seal circumscribing filter 10.

As will now be appreciated, the filter, manufacturing apparatus and method of the present invention enable high productivity in the manufacture of fluid filters of the type used for transmission fluid and engine oil. The present invention also allows the joining of housing section 14, 16 without vibration welding thereby enabling a closer crimp of the edges of the filter media for a tighter seal than has been possible in the prior art.

Those skilled in the art will appreciate that the present invention encompasses many variations in the preferred embodiment described herein. For example, different types of lasers can be used and different types of equipment for directing the laser beam. For example, the laser could be held in a fixed position and controlled mirrors could be used to direct laser beam along a prescribed path instead of using the preferred robot arm. Also, there are a wide variety of materials to form the preferred filter that are also subject to laser welding.

Having thus described the preferred embodiment of the present invention, the following is claimed as new and desired to be secured by Letters Patent:

1. A fluid filter manufacturing method comprising:
   (a) placing first and second filter sections of a fluid filter in an abutting relationship, said first section including a circumscribing first flange composed of synthetic resin material transmissive to laser light, said second section including a circumscribing second flange composed of synthetic resin material opaque to laser light and subject to melting upon exposure thereto, said flanges being complementally configured and defining a chamber with filter media therein, step (a) including the step of placing said flanges in an abutting relationship, there being a circumscribing juncture between said flanges;
   (b) directing laser light from a source thereof through said first flange onto said second flange at said juncture thereby forming a melt of synthetic resin material at said juncture;
   (c) discontinuing said laser light allowing said melt to solidify in order to join said flanges and thereby join said sections to form said fluid filter and to form a fluid seal circumscribing said filter at said juncture; and
   (d) before steps (b) and (c), crimping the filter media between the first and second sections of the filter to thereby form a seal.

2. The method of claim 1, said synthetic resin material including glass-filled nylon 6/6.

3. The method of claim 1, said first flange being composed of unpigmented glass-filled nylon 6/6.

4. The method of claim 3, said first section being integrally composed of unpigmented glass-filled nylon 6/6.

5. The method of claim 1, said second flange being composed of pigmented glass-filled nylon 6/6.

6. The method of claim 5, said second section being integrally composed of pigmented glass-filled nylon 6/6.

7. The method of claim 1, step (b) including the step of directing a laser beam as said laser light from a neodynium YAG laser as said source.

8. The method of claim 1, step (b) including the step of directing a laser beam as said laser light as a pulsed laser beam.

9. The method of claim 1, step (b) including the step of directing a laser beam as said laser light as a continuous wave laser beam.

10. The method of claim 1, step (b) including the step of directing the laser beam as said laser light along a continuous path defined by said juncture.

11. The method of claim 1, there being a laser coupled with a laser shifting mechanism controlled by programmable processor, step (b) including the step of controlling said shifting mechanism according to the programming of said processor to shift said laser in a manner to direct a laser beam as said laser light emitted therefrom along said juncture.

12. The method of claim 11, said processor including a programmable logic controller.

13. The method of claim 11, said shifting mechanism including a robot arm.

14. The method of claim 11, said laser including a neodynium YAG laser.

15. The method of claim 14, said laser including a pulsed laser.

16. The method of claim 14, said laser including a continuous wave laser.

17. The method of claim 1, said first section being integrally composed of unpigmented synthetic resin material, said second section being integrally composed of pigmented synthetic resin material, step (b) including the step of directing a laser beam as said laser light from a pulsed laser along a path defined by said juncture.

18. The method of claim 17, there being a laser coupled with a laser shifting mechanism controlled by programmable processor, step (b) including the step of controlling said shifting mechanism according to the programming of said processor to shift said laser in a manner to direct said laser beam emitted therefrom along said juncture.

19. The method of claim 18, said laser including a pulsed laser.

20. The method of claim 19, said synthetic resin material including glass-filled nylon 6/6.

21. The method of claim 19, said laser including a continuous wave laser.

22. The method of claim 1, said filter including a transmission filter.

* * * * *